United States Patent
Hüttlin

(10) Patent No.: US 6,949,141 B2
(45) Date of Patent: Sep. 27, 2005

(54) APPARATUS FOR TREATING PARTICULATE-SHAPED MATERIAL HAVING A VERTICAL-ADJUSTMENT DEVICE

(76) Inventor: Herbert Hüttlin, Rümminger Strasse 15, 79539 Lörrach (DE)

(*) Notice: Subject to any disclaimer, the term of this patent is extended or adjusted under 35 U.S.C. 154(b) by 0 days.

(21) Appl. No.: 10/680,486

(22) Filed: Oct. 7, 2003

(65) Prior Publication Data

US 2004/0123798 A1 Jul. 1, 2004

(30) Foreign Application Priority Data

Oct. 7, 2002 (DE) .......................................... 102 48 116

(51) Int. Cl.⁷ ............................. B05C 5/00; B05C 11/06
(52) U.S. Cl. ....................................... 118/303; 118/62
(58) Field of Search ........................... 118/303, DIG. 5, 118/58, 62; 34/168, 169, 582; 425/222; 261/77, 93

(56) References Cited

U.S. PATENT DOCUMENTS 4,967,688 A * 11/1990 Funakoshi et al. .......... 118/303
6,253,465 B1 * 7/2001 Ichitani et al. ................ 34/565
6,367,165 B1 * 4/2002 Huttlin ........................ 34/582

FOREIGN PATENT DOCUMENTS

| DE | 37 05 343 A1 | 9/1987 |
|---|---|---|
| DE | 199 04 147 C2 | 5/2001 |
| DE | 100 54 557 A1 | 5/2002 |

* cited by examiner

Primary Examiner—Chris Fiorilla
Assistant Examiner—Yewebdar Tadesse
(74) Attorney, Agent, or Firm—St. Onge Steward Johnston & Reens LLC

(57) ABSTRACT

An apparatus for treating particle-shaped material has a process chamber for accommodating and treating the material. A base is composed of guide plates which are placed one above the other in different planes and overlap one another and between which slots are arranged, via which process air can be directed into the process chamber with an essentially horizontal component motion. It is proposed to provide a vertical—adjustment device which interacts with the guide plates and by means of which the distance between the guide plates and thus the height of the slots can be varied.

12 Claims, 4 Drawing Sheets

APPARATUS FOR TREATING PARTICULATE-SHAPED MATERIAL HAVING A VERTICAL-ADJUSTMENT DEVICE

This application claims priority from pending German Application No. 102 48 116.4 filed on Oct. 7, 2002.

FIELD OF THE INVENTION

The invention relates to an apparatus for treating particle—shaped material, having a process chamber for accommodating and treating the material, a base of the process chamber being composed of guide plates which are placed one above the other in different planes and overlap one another and between which slots are formed, via which process air can be directed into the process chamber with an essentially horizontal component motion.

Such apparatuses have been disclosed, for example, by German patent DE 199 04 147 C2 and German patent application DE 100 54 557 AI.

Such apparatuses serve to dry, granulate or coat a particle—shaped material.

A gaseous medium, "process air", is directed via the base into the process chamber and at the same time enters the process chamber, in an approximately horizontally directed manner, through the numerous slots between the overlapping guide plates.

The guide plates in this technology were originally assembled such as to be placed one above the other in an imbricated manner to form an annular ring, so that the slots extend radially. However, the guide plates set at an angle and overlapping in an imbricated manner form a relatively inhomogeneous or wavy surface of the base.

In the further development of this technology, the guide plates were configured in such a way that they are placed lying one above the other in different horizontal planes. The subject matter of the present invention are bases configured in such a way.

German patent DR 199 04 147 C2 discloses slots extending along secants of a circular base. There are two groups of flat guide plates here which are in each case placed one above the other, the slots being oriented in such a way that they direct the process air passing through towards a central diagonal rising zone.

In German patent application DR 100 54 557 AI, the slots in the outer circumferential region are adapted to the outer contour of the round process chamber and, as viewed radially inward, increasingly approach the contour of the rectilinear diagonal rising zone. For discharging the treated product, a central part of the base can be lifted. The resulting central opening serves for discharging the product via a pipe connected to the opening.

In German patent DE 102 02 584 CI, the slots are designed in such a way that they run around a spray nozzle arranged eccentrically to the center point of the base.

In German patent application DE 101 29 166 CI, the guide plates are designed as annular plates, so that circular slots are formed.

In this technology, which is mainly used in the pharmaceutical field, it is endeavoured, where possible, to treat different types of product with a single apparatus. The range of particle—shaped material extends in this case from powders as fine as dust, which are usually granulated to form larger agglomerates, up to relatively large tablets or oblongs which are to be covered with a coating.

The filling and emptying of the process chamber is also problematic, where there is the risk, in particular in the case of niaterial of very fine particles, of material particles coming out of the process chamber through the base via the slots and entering the passages conducting the process air.

This leads to considerable problems during cleaning, a factor which necessitates complete dismantling of the apparatus for cleaning purposes, for example when changing over to other products.

German patent application DR 37 05 343 AI discloses to lift the entire base via a plunger. A circumferential slot between the conically enlarging wall surrounding the base and the lifted wall serves for discharging the treated product.

It is therefore an object of the present invention to develop an apparatus of the type mentioned at the beginning to the effect that as large a range of particle—shaped material as possible can be treated, with an excellent result.

SUMMARY OF THE INVENTION

According to the invention, the object is achieved in that there is a vertical-adjustment device which interacts with the guide plates and by means of which the distance between the guide plates and thus the height of the slots can be varied.

The vertical adjustability provides for an additional variable parameter, which makes it possible to react to different material particles in a flexible manner. Depending on the degree of filling, on the size of the particle—shaped material to be moved, and on its properties allowing for swirling on an air cushion to form a uniform fluidized bed, the guide plates can be raised or lowered and thus the height of the slots can be varied. A larger cross section of the slot openings permits greater rates of flow per unit of time of process air through the base, so that it is possible to react in a flexible manner to charges of different size and/or to different material particles.

In a further configuration of the invention, the vertical—adjustment device is designed in such a way that the vertical distance between the guide plates can be varied from zero up to a maximum distance.

This configuration not only has the abovementioned advantage of the vertical adjustability as such, but also opens up the possibility of placing the plates on one another at a zero distance, so that there are then no open slots at all. This state is desirable in particular when filling and emptying the process chamber, if, for example, the entire product container is laterally tipped for this purpose. As a result, it is then impossible for material particles to fall through the base and pass into the air—guide paths. As a result, not only can these undesirable losses of material particles be avoided, which represent a considerable value in the case of very expensive pharmaceuticals, but the entire apparatus is also substantially simpler to clean. The vertical—adjustment device does not open the slots until an adequate pressure of process air is already acting on the underside of the base, so that particles are continuously prevented from being able to fall through the base during operation under any circumstances.

In a further configuration of the invention, the vertical-adjustment device is designed in such a way that the guide plates can be vibrated back and forth in the direction of the vertical adjustability.

This measure has the considerable advantage that the vertical adjustability is used to vibrate the guide plates back and forth with low amplitude in the adjusting direction during operation, so that any possible caking on the top side can be released or cannot form at all. This also promotes the formation of an air cushion between the top side of the guide plates or of the base and the lower end of the fluidized bed, so that an especially gentle treatment can be carried out in the case of extremely sensitive material.

In a further configuration of the invention, the vertical-adjustment device has at least one adjusting traverse which is connected to each of the guide plates.

The provision of such an adjusting traverse provides for a mechanically simple component in order to lift or lower the plates via a simple coupling.

In a further configuration, the vertical-adjustment device has a vertical—adjustment member arranged centrally in the base.

This measure has the advantage that not only is a single adjusting member sufficient in order to control the vertical adjustability, but the central arrangement does not influence the flow eccentrically and thus does not constitute an additional problematical flow obstacle. In many base constructions, there is of course a closed—off region in the center anyway, for example a central cone, around which a toroidally rotating sheet of moving material forms.

The central arrangement also opens up the possibility of attaching the vertical—adjustment device directly to the base, so that the base together with integrated vertical—adjustment device can be removed or inserted in a single operation.

In a further configuration of the invention, at a base which, as viewed radially from outside to inside, consists of annular guide plates placed one above the other, there is a central upright vertical—adjustment member which is connected to a radially inner end of a crosspiece which is pivotably linked at the radially outer end.

This measure has the considerable advantage from the design point of view that the connection to the individual annular guide plates can be produced via the crosspiece, and the single central vertical-adjustment member, by lifting and lowering the crosspiece, effects the corresponding synchronous vertical adjustment of all the guide plates which are connected to the crosspiece. This results in the abovementioned advantages of the compact type of construction and the integration of the vertical-adjustment device directly in the base.

It is also possible to provide the vertical—adjustment device at the outer margin of the base or of the apparatus.

In a further configuration of the apparatus, the vertical-adjustment member is designed as a compressed—air adjusting stud.

This measure firstly has the advantage that the vertical adjustment can be effected in a simple manner via the compressed—air control, and at the same time the abovementioned vibration of the base can also be effected by a pulsed compressed—air feed.

In a further configuration of the invention, the vertical—adjustment device is arranged below the base.

This measure has the considerable advantage that the vertical—adjustment device has no components in the actual process chamber, but rather these components are all present below the base. The process air, which flows against the base from below, can flow around the requisite components of the vertical—adjustment device without any problems and pass through the base.

In a further configuration of the invention, the adjusting traverse has a plurality of radially extending crosspieces, in particular three to six crosspieces.

This measure has the advantage that, depending on the configuration and size of the base, a mechanically reliable and clearly controlled vertical adjustment is provided for. To return to the abovementioned example having the plurality of annular plates placed one above the other, just three cross—pieces offset by an angle of about 120° can be sufficient in order to ensure the uniform lifting over the entire annular circumference. However, four or six crosspieces may also be provided.

Since, in the configuration as annular plates, the plate closest to the center is designed as a closed disk, the vertical-adjustment member can be arranged in this region, in particular below the base, in order to achieve the abovementioned advantages.

In a further configuration of the invention, in the case of a base which is composed of different groups of guide plates placed one above the other, each group interacts with a vertical-adjustment device.

In the German patent DR 101 29 166 CI, there is a first group of annular plates placed one above the other, this first group, as viewed radially from outside to inside, being placed one below the other and being followed, after an annular rising zone, by a further group, which as viewed radially from outside to inside, are placed one above the other. Here, provision can be made for two separate vertical—adjustment devices to be provided in order to be able to activate the two groups of guide plates individually, which provides a further increase in the flexibility, namely by virtue of the fact that different slot heights can be set at different groups of guide plates.

An exemplary embodiment of a means of realizing vertical adjustability in an especially simple manner from the design point of view is described below.

It goes without saying that the abovementioned features and the features still to be mentioned below can be used not only in the respectively specified combination but also in other combinations or on their own without departing from the scope of the present invention.

BRIEF DESCRIPTION OF THE DRAWINGS

The invention is described and explained in more detail below with reference to the explained exemplary embodiments mentioned above, in connection with the attached drawings, in which:

FIG. 4 shows a bottom view of the base of FIG. 3, the enclosed region being additionally shown greatly enlarged in FIG. 4a.

DETAILED DESCRIPTION OF A PREFERRED EMBODIMENT

Figure 1:
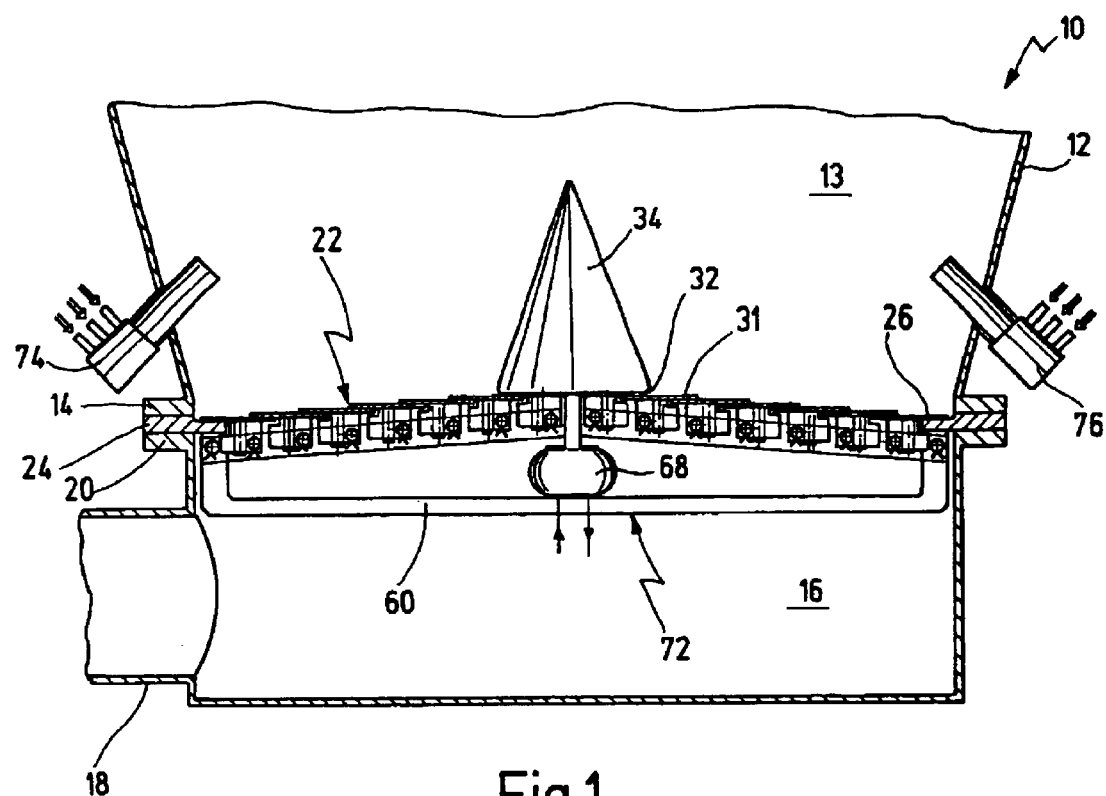
FIG. 1 shows in a highly schematic manner a longitudinal section of an apparatus for treating particle—shaped material in the region of the base and the inflow chamber.

The apparatus shown in the figures for treating particle—shaped material is provided overall with the reference numeral 10.

The apparatus 10 has a container 12 having a wall widening conically outward. The container 12 is closed via a lid at its top side (not shown here). The interior space of the container 12 constitutes a process chamber 13. An encircling annular flange 14 is provided at the bottom end of the container 12.

Figure 5:
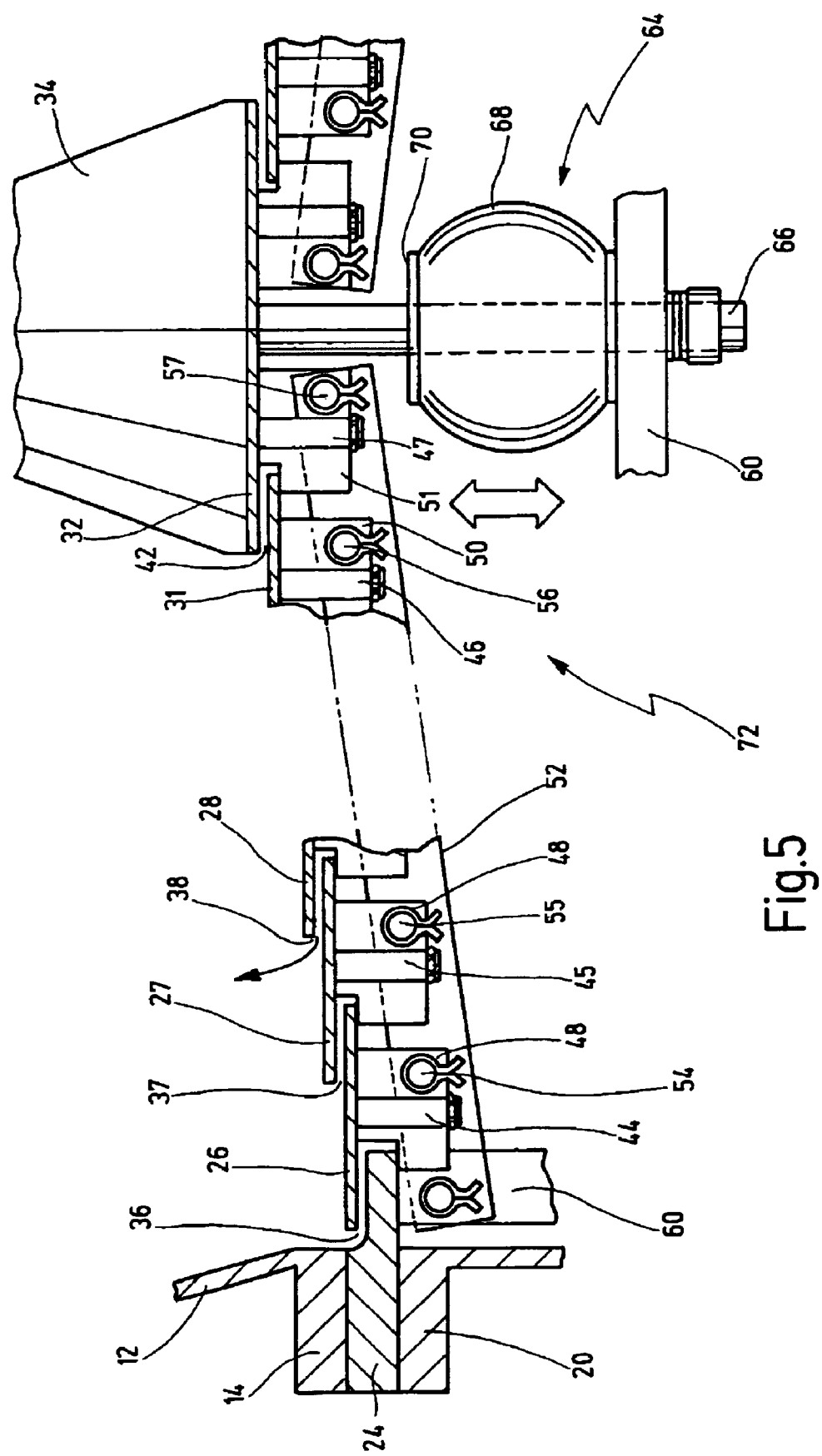
FIG. 5 shows a cutaway, partly greatly enlarged representation of the section of FIG. 2 in the left-hand marginal region and in the central region.

An annular flange 20 of an inflow chamber 16 is flange-mounted on the underside of the annular flange 14 with an intermediate flange 24 placed in between (see FIG. 5). The inflow chamber 16 is provided with an inlet 18, via which process air 78, as will be described below, can be introduced.

Figure 3:
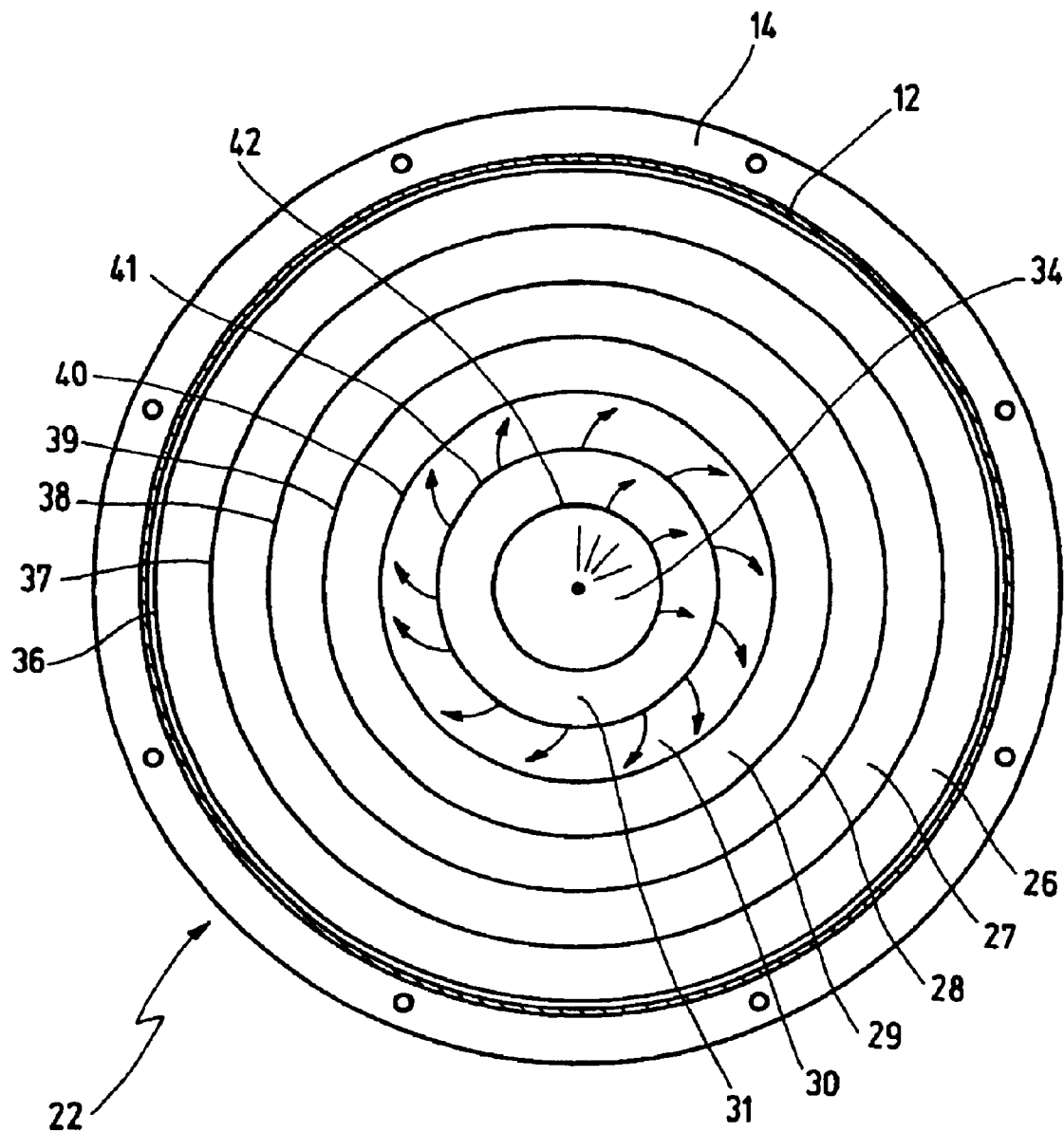
FIG. 3 shows a plan view of the base of the apparatus of FIG. 1.

The intermediate flange 24 is part of a base 22 of the apparatus 10, this base 22 being composed of a series of six annular guide plates 26 to 31, as can be seen in particular from the sectional representations and the plan view of FIG. 3. The central closure is formed by a disk 32, on the top side of which a cone 34 is mounted, that is to say so as to extend into the process chamber 13.

As can be seen in particular from the representations of FIG. 3 and FIG. 5 on the left-hand side, a slot 36 is formed between the intermediate flange 24 and the outermost annular guide plate 26.

Accordingly, a slot 37 is formed between the guide plate 26 and the next inner guide plate 27 of smaller diameter arranged above said guide plate 26.

The same then applies to the next inner guide plate 28. This guide plate 28 lies in a further horizontal plane and above the guide plate 27, so that a slot 38 is then formed as a result. This correspondingly continues up to the innermost, highest-situated guide plate 31, the central disk 32 lying at the highest level, so that the innermost slot 42 is formed between the disk 32 and the innermost guide plate 31.

The annular guide plates 26 to 31 therefore lie in different horizontal planes and are placed one above the other in such a way that they overlap one another, a radially inner guide plate overlapping the radially next outer guide plate lying under it in each case.

As a result, the slots are oriented in such a way that process air 78 (see FIG. 2), which is directed into the inflow chamber 16, is directed through the slots 36 to 42 in such a way that said process air 78 enters in a radially outwardly directed manner.

Figure 4:
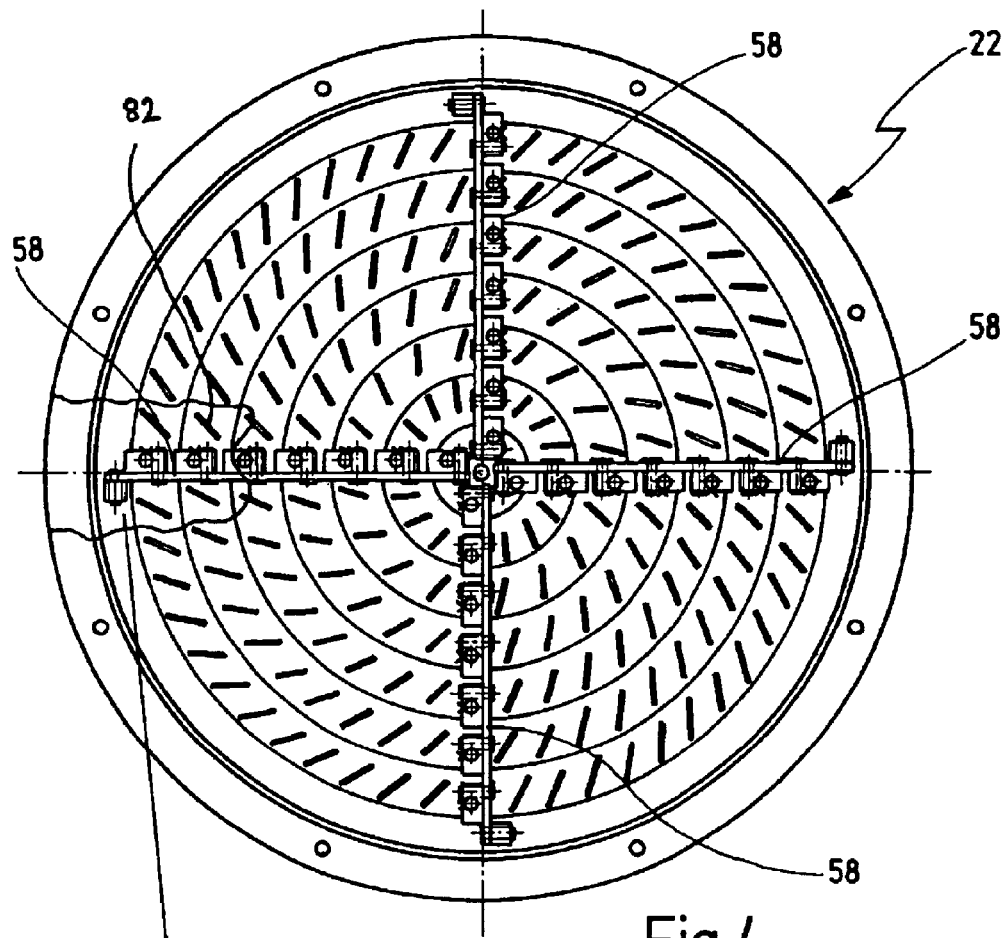
Figure 4A:
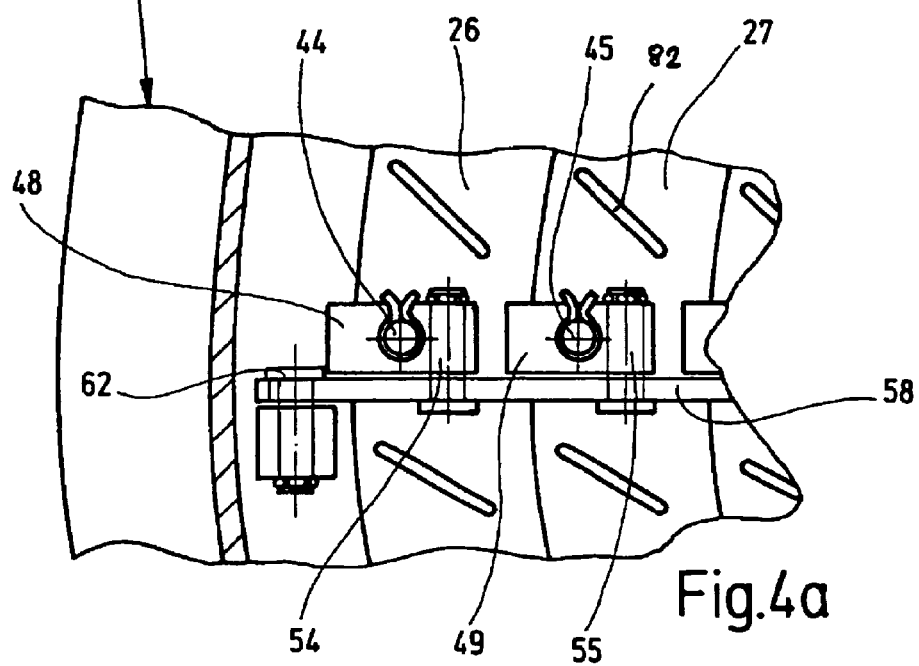

As can be seen in particular from FIG. 4, numerous guide elements 82 are arranged on the underside of the guide plates 26 to 31, these guide elements 82 imposing a circumferential flow component on the passing process air in addition to the radial flow component, as can be seen from the flow arrows in FIG. 3. This promotes the formation of a toroidal vortex ring rotating about the central cone 34 in a certain direction, here clockwise.

It can be seen in particular from the representation of FIGS. 4 and 5 that push-in pins project downward from the underside of each annular guide plate 26 through 31. Projecting from the underside of the guide plate 26 are four push-in pins 44, each offset circumferentially by 90°. This equally applies to the other guide plates, in which case a push-in pin 45, which projects from the underside of the guide plate 27, and the push—in pins 46 and 47, which project from the underside of the guide plate 31 and the disk 32, respectively, can accordingly be seen in FIG. 5.

Each of the four push-in pins which project from the underside of each annular guide plate 26 to 31, or the four push-in pins projecting from the underside of the disk 32, are inserted into connecting elements and secured via a snap ring.

Identified in FIG. 4 as typical of the connecting elements are the connecting elements 48 and 49, and the connecting elements 50 and 51 are correspondingly identified in FIG. 5.

Such a row of connecting elements 48 to 51 is connected to an adjusting traverse 52.

This is effected via pins, the corresponding pins 54 and 55 again being shown here in FIG. 4, and the corresponding pins 56 and 57 again being shown in FIG. 5. These pins run transversely to the push-in pins and are arranged next to the latter and are likewise designed as push—in pins and are secured via corresponding snap rings (not identified in more detail here), as can be seen in particular from FIG. 4.

The adjusting traverse 52 consists of four roughly beam—shaped crosspieces 58 offset in each case by 90°. Each crosspiece 58 extends from the intermediate flange 24 right up to the underside of the central disk 32.

The intermediate flange 24 is transversely braced via a stirrup 60. The radially outer end of a crosspiece 58 is pivotably linked to the stirrup 60 via a joint 62. The radially inner end of a crosspiece 58, as mentioned above, is pivotably linked via the innermost pin 57 to the connecting element 51 which projects from the underside of the disk 32.

All the push-in pin connections described are designed in such a way that they are pivotable about the pin axis, to be precise with certain radial play.

Figure 2:
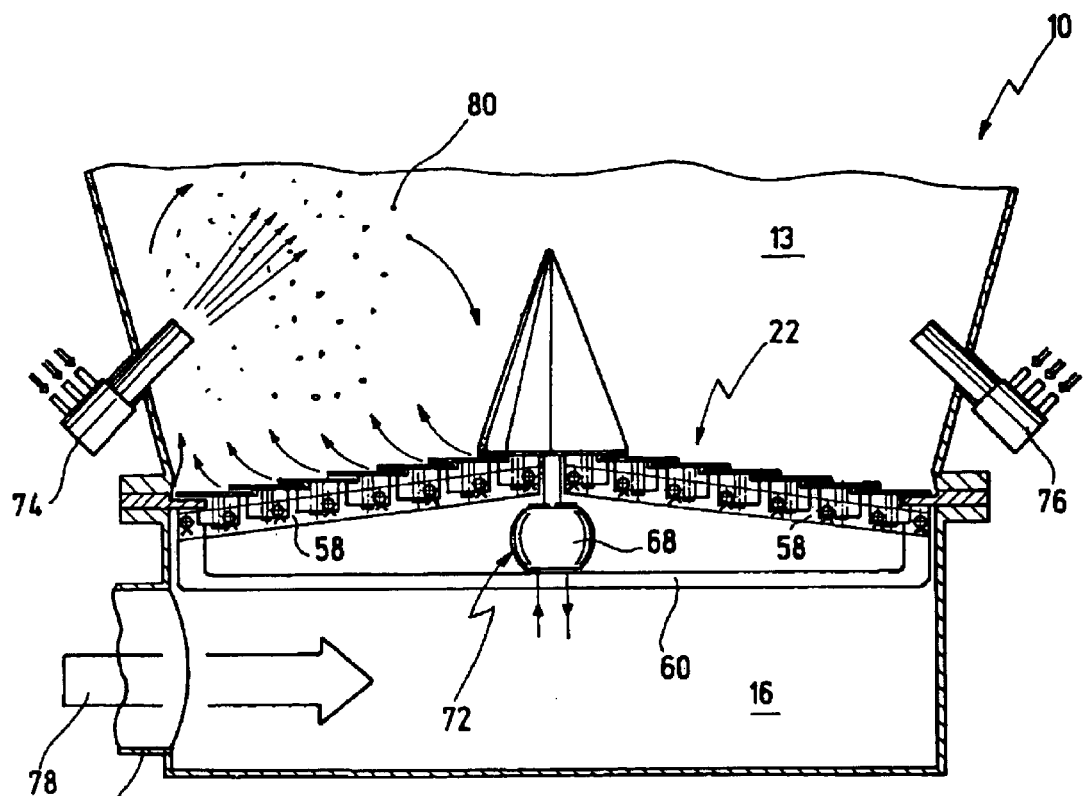
FIG. 2 shows a representation, corresponding to FIG. 1, of the apparatus during operation, with guide plates vertically lifted compared with the representation of FIG. 1.

As can be seen in particular from the sectional representations of FIGS. 1, 2 and 5, a central vertical—adjustment member 64 is provided.

This vertical—adjustment member 64 consists of an adjusting stud 66 which is surrounded by a bellows 68.

The bellows 68 is supported on the base side on the stirrup 60, in which the adjusting stud 66 is also accommodated in a displaceable manner. At the top end, the bellows 68 is supported on a disk 70, which is firmly connected to the adjusting stud 66.

The assembly consisting of vertical—adjustment member 64 and the crosspieces 58 which are connected to the underside of the guide plates constitutes, as an entity, a vertical—adjustment device 72.

If compressed air is directed into the bellows 68, the latter inflates and lifts the crosspieces 58 and thus also lifts the guide plates 26 to 31. If pulsating compressed air is admitted to the bellows 68, the entire vertical—adjustment device 72 vibrates or oscillates up and down about a certain height level.

Shown in FIG. 1 is a position in which the vertical-adjustment device 72 is lowered to the maximum extent. In this position, all the guide plates 26 to 31 lie on one another, the central disk 32 lies on the guide plate 31, and the outermost guide plate 26 lies on the intermediate flange 24, so that there are no longer any open slots between them. The base 22 is thus closed. It can be filled in this state, for example, with a material to be treated or can be laterally tipped for emptying the material after a treatment. Due to the compact type of construction, the base 22 together with vertical—adjustment device 72 can be removed or inserted as a construction unit.

It can be seen from FIG. 1 that nozzles 74 and 76 are also inserted laterally into the wall of the container 12 in order to apply a treatment medium to the material to be treated.

During the granulation of fine powdery material particles to form larger agglomerates, this will be, for example, a viscous liquid which is sprayed together with spray air to form a fine spray mist.

Shown in FIG. 2 is an operating position in which the bellows 68 has been slightly inflated, the crosspieces 58 have been lifted as a result, and the guide plates 26 to 31 now lie at a certain distance one above the other, so that the slots 37 to 42 designated in more detail in FIG. 3 are open for the process air 78 to pass through. The process air 78 entering the inflow chamber 16 via the inlet 18 can therefore pass through the base 22 through these slots 36 to 42 and can discharge first of all approximately horizontally, the guide elements 82 on the underside of the guide plates providing the corresponding circumferential directional thrust.

By means of the process air 78, which pushes upward, the fine material particles 80 are swirled to form a bed rotating toroidally about the central cone 34.

As can be seen from the sectional representation of FIG. 2, the material particles rise essentially in the region of the nozzles 74, 76, that is to say in the region of the wall of the container 12, are then moved centrally inward and fall onto the base 22 again on account of the gravitational force. They are then conveyed again by the central cone 34 to the radially innermost slot 42 and are moved from there again in the corresponding circulation.

If the bellows 68 is operated in a pulsating manner, the base 22 vibrates with small amplitude, so that caking can be prevented. Depending on how the material 80 to be treated is configured, the vertical-adjustment device 72 is actuated in order to achieve an optimum slot height, as shown, for example, in FIG. 5.

What is claimed is:

1. An apparatus for treating a particle-shaped material, comprising: a process chamber for accommodating and treating said material; a base of said process chamber being composed of a series of guide plates which are placed one above the other in different planes and overlap one another, thereby forming slots between said guide plates, via which slots a process air can be directed into said process chamber with an essentially horizontal component motion, wherein there is provided a an actively driven vertical-adjustment device which interacts with said guide plates, by means of which the vertical adjustment device a distance between all of said guide plates and thus a height of said slots can be varied optionally, also during said apparatus works.

2. The apparatus of claim 1, wherein said vertical-adjustment device is designed in such a way that a vertical distance between said guide plates can be varied from zero up to a maximum distance.

3. The apparatus of claim 1, wherein said vertical adjustment device is designed in such a way that said guide plates can be vibrated back and forth in a direction of a vertical adjustability.

4. The apparatus of claim 1, wherein said vertical adjustment device having at least one adjusting traverse which is connected to each of said guide plates.

5. The apparatus of claim 1, wherein said vertical adjustment device has a vertical-adjustment member arranged centrally in said base.

6. The apparatus of claim 5, wherein said base, as viewed radially from outside to inside comprises annular guide plates placed one above the other, and said vertical-adjustment device having a central upright vertical-adjustment member which is connected to a radially inner end of a cross-piece which is pivotably linked at a radially outer end.

7. The apparatus of claim 1, wherein said vertical-adjustment device has a vertical adjustment member arranged centrally in said base, said vertical adjustment member being designed as a compressed-air adjusting stud.

8. The apparatus of claim 1, wherein said vertical-adjustment device is arranged below said base.

9. The apparatus of claim 4, wherein said adjusting traverse has a plurality of radially extending crosspieces, selected from the group consisting of three to six crosspieces.

10. The apparatus of claim 1, wherein said base being composed of different groups of series of guide plates placed one above the other, each group interacts with a vertical adjustment device.

11. An apparatus for treating a particle-shaped material comprising:
a process chamber for accommodating and treating said material;
a base of said process chamber being composed of a series of guide plates which are placed one above the other in different planes and overlap one another, thereby forming slots between said guide plates, via which slots a process air can be directed into said process chamber with an essentially horizontal component motion, wherein an actively driven vertical-adjustment device interacts with said guide plates such that a height of said slots can be varied.

12. An apparatus for treating a particle-shaped material, comprising: a process chamber for accommodating and treating said material; a base of said process chamber being composed of a series of guide plates which are placed one above the other in different planes and overlap one another, thereby forming slots between said guide plates, via which slots a process air can be directed into said process chamber with an essentially horizontal component motion, wherein there is provided a vertical-adjustment device which interacts with said guide plates, by which vertical adjustment device changes a distance between said guide plates and thus the height of said slots can be varied, wherein said vertical adjustment device comprises at least one adjusting traverse which is connected to each of said guide plates.

* * * * *